Sept. 25, 1956
S. F. ARMINGTON
2,764,405
MOUNTING FOR LEAF SPRING
Filed Jan. 12, 1953
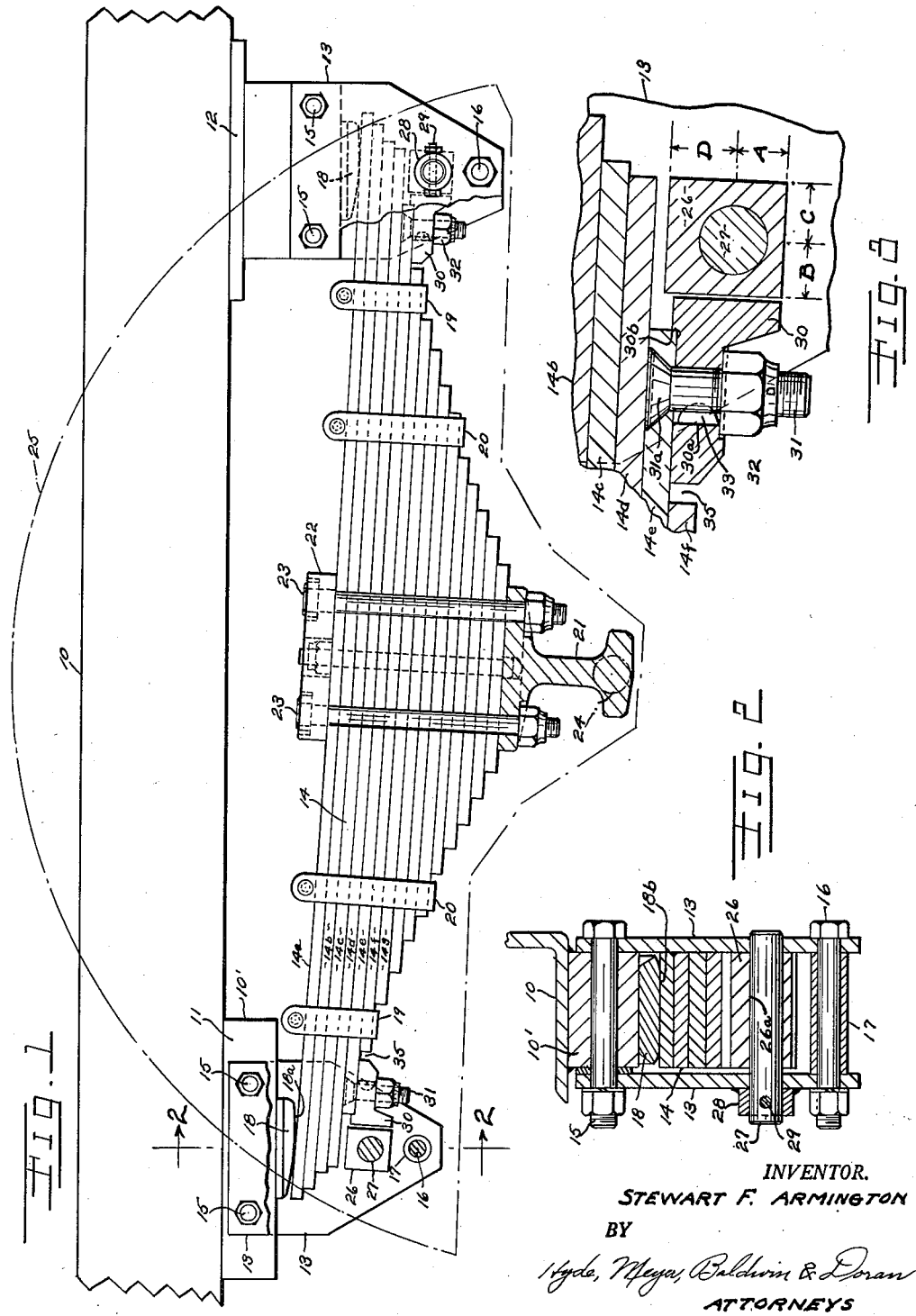
INVENTOR.
STEWART F. ARMINGTON
BY
Hyde, Meyer, Baldwin & Doran
ATTORNEYS United States Patent Office 2,764,405
Patented Sept. 25, 1956

2,764,405

MOUNTING FOR LEAF SPRING

Stewart F. Armington, Willoughby, Ohio, assignor, by mesne assignments, to General Motors Corporation, Detroit, Mich., a corporation of Delaware Application January 12, 1953, Serial No. 330,750

14 Claims. (Cl. 267—56)

This invention relates to improvements in a vehicle axle suspension using leaf springs.

One of the objects of the present invention is to utilize thrust blocks so as to locate the leaf spring and its attached axle in a fore-and-aft position, thus making unnecessary the use of expensive radius rods.

Another object of the present invention is to provide in combination, a vehicle frame member, two spring brackets rigid with the frame member and spaced longitudinally thereof, a leaf spring extending between the brackets, a thrust block carried by each of the brackets and means rigid with opposite ends of the spring horizontally aligned with said blocks, whereby the spring is located in a fore-and-aft position relative to the vehicle.

Other objects of the invention comprise the use of a leaf spring which is approximately flat under normal stationary load so that the end slip under the spring seat is negligible, a spring of such a character that when the vehicle is in motion the spring flexes very slightly above and below a straight line so that the endwise extension of the spring is held to a minimum between the thrust blocks which limit such endwise motion, the mounting of oscillatable thrust blocks under approximately the center of each spring seat to take the end thrust from the spring and to convey it to the frame, the provision of thrust brackets to cooperate with the thrust blocks, said thrust brackets being attached to one of the intermediate spring leaves in a spring composed of a plurality of leaves, an arrangement wherein the plurality of leaves above that to which the thrust bracket is attached is sufficient to take a major portion of the ordinary load and rebound of the spring, a safety arrangement to take care of the possibility that the leaf might break to which the thrust brackets are attached, and novel means whereby various positions of the thrust block regulate the clearance between the thrust blocks and the thrust brackets.

Other objects and advantages of the present invention will be apparent from the accompanying drawings and description and the essential features will be set forth in the appended claims.

In the drawings,

Fig. 1 is a fragmental side elevational view of a vehicle equipped with my invention, the outline of a tire carried by shaft 24 and axle 21 being indicated in dot-dash lines;

Fig. 2 is a sectional view, enlarged, taken along the line 2—2 of Fig. 1; while

Fig. 3 is a fragmental sectional view, enlarged, taken along a vertical plane through bolt 31 at the right-hand end of Fig. 1.

High speed, off-the-highway, rubber-tired equipment often carries very heavy loads and is subjected to very heavy duty. Leaf springs have been used on such equipment but quite often for front axle suspension only. Where these springs were of conventional type having an eye wrapped about a pin at one end of the spring and a shackle mounting on the other, a great deal of twist occurred in the leaf springs, especially in the upper leaves thereof. This happened when one of the wheels passed over a hump, compressing its corresponding spring, so that one spring was compressed considerably more than the other. Since the wrap-type eye on one end of the spring was rigid, this forced a twist in the upper leaf of the spring, causing short life.

For elimination of twisting loads from the spring, flat springs have been used bearing against curved seats. These springs carried the vehicle weight and also took the lateral loads occurring in vehicle operation, but twisting strains were largely eliminated, as radius rods were used to hold the axle in position. These springs also had to take the torque reactions due to braking and driving. This type of installation was satisfactory except that it was costly as to the radius rods, and the radius rods and their attaching parts were objectionable in that these parts were subject to damage and were a maintenance item in themselves.

An object of the present invention is to eliminate the radius rods while using thrust blocks opposite the ends of the leaf spring to locate the axle in a fore-and-aft position. At the same time, the present invention is designed to eliminate twisting strains on the spring and to provide a safe construction.

Another object of the invention is to provide spring seats convex downwardly and engaging opposite ends of the top leaf of the spring, which transfers the spring contact points toward center as the spring flexes under increased load and bump conditions. This greatly reduces spring breakage and improves or softens the ride both empty and loaded.

Another feature that helps to improve the ride and reduce spring breakage is the improved anti-rebound feature comprised of the increased number of rebound taking leaves that extend over the rebound pin and thrust block in the spring bracket assembly.

A vehicle frame member is shown at 10, it being understood that normally there are two such parallel frame members, one at each side of the vehicle. Spring brackets 11 and 12 are rigidly secured to the frame member 10 spaced apart longitudinally of the vehicle. In the present instance, the spring suspension is described in connection with the front axle with the bracket 11 being toward the front of the vehicle, but it should be understood that my invention is also applicable to rear axles. Each bracket comprises a pair of parallel plates 13 lying respectively on opposite sides and close to the frame 14. The brackets are secured to the frame by bolts 15 and the plates 13 are held together at the bottom of each bracket by means of a bolt 16, a sleeve spacer 17 holding the plates 13 parallel. Since the bracket and spring suspension at each end of the spring 14 are the same, one only will be described.

A spring seat 18 is fixed in each spring bracket, each seat being curved in a fore-and-aft direction as indicated at 18a and each being slightly curved in a direction crosswise of the vehicle as indicated at 18b. These spring seats engage the upper surface of the top leaf 14a of the spring near the ends thereof.

Each spring 14 comprises a plurality of leaves 14a, 14b, 14c, etc., the longest leaf being at the top and the shortest leaf at the bottom. All of these leaves are bound together by clips 19 and 20. In the mid-portion of the spring, an axle 21 is rigidly secured to the spring by means of the clamping plate 22 and bolts 23. With the present invention, it is unnecessary to provide radius rods between the main frame of the vehicle and the axle 21, since my invention provides simple means for positioning the axle positively in a fore-and-aft direction relative to the vehicle frame.

A thrust block 26 is provided in each of the spring brackets 11 and 12 lying opposite to and with slight clearance from a portion of the spring 14 so as to limit the fore-and-aft movement of the spring. In the present instance, a cylindrical pin 27 passes through a cylindrical opening 26a in the block 26 so that the block is oscillatably mounted on the pin 27. The pin passes through a sleeve 28 which is rigidly secured to one of the plates 13 as by welding. A bolt 29 passes through sleeve 28 and pin 27 so as to hold the pin in position. A thrust bracket 30 is rigidly secured, as by bolt 31 to one end of a leaf of the spring below the top leaf. Here I have shown the bracket 30 as secured to the leaf 14e which has four leaves above it and a large number of shorter leaves below it. The bolt 31 has a countersunk head 31a and a securing nut 32 holding the bracket 30 rigid to the spring leaf 14e. A key 33 fits in a keyway 30a so as to hold the bolt 31 against turning in the bracket 30.

The spring 14 is so designed that it is approximately flat under normal stationary load so that the end slip under the spring seats 18 is negligible. Under these conditions, when the spring 14 is flat, the clearance at 34 between the thrust bracket 30 and the thrust block 26 is very slight and preferably of the order of zero to a maximum of about $1/16$ inch.

Preferably, but not necessarily, in order to control the clearance 34 under average manufacturing conditions, the thrust block 26 is so designed that each thrust block has its pin opening 26a off center so that the dimensions A, B, C and D are respectively 29, 31, 33 and 35 thirty-seconds of an inch respectively. Since four positions of each block 26 are possible a total of eight positions of adjustment are available in increments of $1/16$ inch each.

It will be noted that the leaves 14a, 14b, 14c and 14d (above the leaf to which the thrust bracket 30 is attached) are all longer than the leaf 14e and extend above the thrust block 26. It will be noted that each of the top four leaves of the spring are shortened by increments which are considerably shorter than the increments between leaves 14f, 14g and other leaves below them in the spring construction. In fact, the shortening of the leaves below 14e is by increments from two to six times the increments of shortening of the top four leaves. This provides, in the top four leaves of the spring, a very strong leaf which is sufficient to take the major portion of the normal spring load and the rebound when the vehicle is in use, and moving. In other words, on the rebound the thrust block 26 strikes upwardly against the leaf 14d and this transfers the rebound or upward loads into the spring leaves above it. In this design all four of the leaves 14a, 14b, 14c and 14d work together in taking the rebound loads directly. This compares with one or two leaves taking the rebound load in common practice.

It will be noticed from the above, that the leaf 14e carrying the thrust bracket 30 carries no rebound load out beyond clips 19. Further, therefore, rebound or upward load cannot contribute toward breakage of the exposed ends of this leaf. The four top leaves together are sufficiently strong to greatly reduce stresses due to downward load on these four top leaves plus leaf 14e out beyond clips 19 as compared with the spring body between clips 19. This added strength factor in the ends of leaf 14e eliminates chance of breakage of this leaf due to downward load. While leaf 14e takes all of the end thrust, this is the major load that it does take in its exposed ends, while between clips 19 it is supported by the leaves above and below it and laterally by clips 19 and 20 and, being in compression only as far as fore-and-aft loads are concerned, parts of it cannot fall out of place in case of possible breakage, insuring it ability to take the thrust loads.

It will be noted that the thrust bracket 30 has a shoulder 30b extending crosswise of its top surface and abutting the end of the spring leaf 14e. This takes some of the strain off the bolt 31 making a very high strength factor in this connection. The spring bracket attachment renders it more difficult for the spring leaf 14e to work out of the spring assembly in case this particular leaf should break.

It will be noted that the spring leaf 14f, immediately beneath the spring leaf 14e lies just opposite and close to the inner end of the thrust bracket 30. In other words, the clearance at 35 between the thrust bracket and the end of leaf 14f is approximately ¼ inch. This distance is short, so that should the leaf 14e taking the thrust, break and possibly work out of the spring assembly, then this leaf 14f which I have called a safety leaf will hold the axle 21 in position.

The spring 14 is so designed that when the vehicle is moving and under load, the spring flexes above and below a straight line or flat position by a very small amount. It results from this that the distance between the outer faces of the thrust brackets 30 at opposite ends of the spring varies by only a negligible amount.

It will be noted that the thrust blocks 26 are located approximately vertically under the center of the associated spring seats 18. This minimizes the vertical sliding of the thrust brackets against the thrust blocks. At the point where the thrust surfaces meet, between 26 and 30, very little up-and-down movement results from spring deflection.

Due to the contour of the spring, in its free or unloaded position spring contact between leaf 14a and the downwardly convex faces 18a of spring seats 18 is at or near the ends of the spring, giving a long effective spring length, resulting in the easiest possible ride when the truck is empty. As the spring flattens and then goes to a reverse bend under load and bump impacts, the contact points move toward center greatly shortening the effective spring length as increased loads are applied. This greatly reduces the maximum spring stresses under load and especially under maximum bump. This feature in combination with other features definitely provides a softer ride both empty and loaded and still permits the use of the thrust block type of mounting without getting too much relative movement of the thrust surfaces. In addition to the improved ride this combination also results in a great reduction in maximum spring stress with resultant longer spring life.

What I claim is:

1. In combination, a vehicle frame, two brackets rigid with said frame and spaced longitudinally thereof, a leaf spring extending between said brackets and having its ends supported therein, an axle secured to the mid-portion of said spring, wheel means carried by said axle and supporting said vehicle, thrust stop means comprising thrust blocks carried by said brackets and normally laterally spaced from the ends of said leaf spring and in line with and engageable by stop surfaces at opposite extreme ends of portions of said leaf spring, there normally being slight clearance between said thrust block means and the stop surfaces on said spring, and said spring stop surfaces and said thrust block means being the sole means for positioning said axle fore and aft with respect to said vehicle.

2. In combination, a vehicle frame, two brackets rigid with said frame and spaced longitudinally thereof, a leaf spring extending between said brackets and having its ends supported therein, an axle secured to the mid-portion of said spring, wheel means carried by said axle and supporting said vehicle, thrust stop means comprising thrust blocks carried by said brackets and normally laterally spaced from the ends of said leaf spring and in line with an engageable by stop surfaces at opposite extreme ends of portions of said leaf spring, there normally being slight clearance between said thrust block means and the stop surfaces on said spring, and said spring stop surfaces and said thrust block means being the sole means for positioning said axle fore and aft with respect to said vehicle, said leaf spring comprising a top leaf and a plurality of leaves below it, each stop surface including a thrust member detachably secured to one end of one of said leaves below the top leaf.

3. Vehicle spring suspension means including a vehicle frame member, two spring brackets rigid with said frame member and spaced longitudinally thereof, a leaf spring extending between said brackets, spring seats in each of said brackets having spring engaging surfaces fixed with respect to said frame member and respectively engaging the upper faces of the ends of said spring, a thrust block carried by each of said brackets, and stop means rigid with opposite ends of said spring and horizontally aligned with said blocks for engagement therewith, there being slight clearance normally between said rigid means and said block when said leaf spring is flat, each of said spring engaging surfaces has an arcuate surface in a plane perpendicular to the length of said spring to form a rolling contact with said spring faces to permit tilting of said spring crosswise of said vehicle, sufficient clearance existing between each of said brackets and spring to permit said tilting.

4. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, a thrust block carried by each of said brackets, each said thrust block having a top surface located approximately vertically below its associated spring seat and a thrust engagement surface extending approximately vertically downwardly from said top surface, and stop means rigid with opposite ends of said spring horizontally aligned with said blocks for engagement therewith, there being slight clearance normally between said rigid means and said block when said leaf spring is flat.

5. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, a thrust block carried by each of said brackets, and stop means rigid with opposite ends of said spring and horizontally aligned with said blocks for engagement therewith, there being slight clearance normally between said rigid means and said block when said leaf spring is flat, each of said thrust blocks being oscillatably mounted in its associated bracket for movement about a transverse axis.

6. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, a thrust block carried by each of said brackets, and stop means rigid with opposite ends of said spring and horizontally aligned with said blocks for engagement therewith, there being slight clearance normally between said rigid means and said block when said leaf spring is flat, a pin secured in one of said brackets and extending approximately centrally but slightly off center through its associated thrust block, there being an opening through said block for receiving said pin, and said opening being spaced from one face of said block by a distance different by a small increment from its distance from another face of said block, whereby said block may be turned on said pin to present different faces toward said spring to control said slight clearance.

7. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, said spring comprising a plurality of leaves differing in length with the longest leaf at the top, a thrust bracket rigidly secured to and located at the end of one of said shorter leaves below the top leaf, and a thrust block fixed in one of said spring brackets adjacent said thrust bracket and at least partially aligned horizontally with said thrust bracket, said one shorter leaf stopping short of said thrust block so that said one shorter leaf absorbs end thrust but no rebound and the portion of the spring thereabove absorbs rebound but no end thrust, there being slight clearance normally between said thrust bracket and said block when said leaf spring is flat.

8. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, said spring comprising a plurality of leaves differing in length with the longest leaf at the top, a thrust bracket rigidly secured to one of said leaves below the top leaf, and a thrust block fixed in one of said spring brackets adjacent said thrust bracket and at least partially aligned horizontally with said thrust bracket, there being slight clearance normally between said thrust bracket and said block when said leaf spring is flat, a plurality of said spring leaves extend above said thrust block and said one leaf to which said thrust bracket is secured stops short of said block and rebound occurs between said thrust block and said plurality of leaves beyond said one leaf.

9. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, said spring comprising a plurality of leaves differing in length with the longest leaf at the top, a thrust bracket rigidly secured to and located at the end of one of said shorter leaves below the top leaf, and a thrust block fixed in one of said spring brackets adjacent said thrust bracket and at least partially aligned horizontally with said thrust bracket, there being slight clearance normally between said thrust bracket and said block when said leaf spring is flat, a shoulder on said thrust bracket engages the end of said one leaf to which said bracket is secured but stops short of the leaf immediately above.

10. The combination of claim 7 wherein a plurality of spring leaves extend above said thrust block and above said one leaf to which said thrust bracket is secured, said spring comprising a plurality of leaves below said one leaf, the leaves in said spring becoming progressively shorter by increments from the top down, and said increments being substantially less in the leaves above said one leaf than in the leaves below said one leaf.

11. The combination of claim 7 wherein said spring comprises a plurality of leaves above and a plurality of leaves below said one leaf, and said leaves above said one leaf are sufficiently strong to carry a major portion of the load and rebound forces to which said spring is subjected.

12. In a vehicle spring suspension means wherein a frame member is provided with two fixed spring brackets spaced longitudinally thereof, a plural leaf spring extended between said brackets with its ends laterally embraced by said brackets, and an axle secured to the midportion of said spring; the combination therewith of spring seats one in each bracket and having lower faces curved in a fore-and-aft direction engaging the upper faces of the top leaf of said spring, a cylindrical pin in each of said brackets directly below its associated spring seat and extending crosswise of said vehicle, a thrust block oscillatably mounted on each said pin, a thrust bracket secured to each of the opposite ends of a thrust spring leaf below the top leaf of said spring, there being a plurality of longer leaves above said thrust leaf and extending above said thrust block, there being a plurality of shorter leaves below said thrust leaf, spring clips binding all of said leaves together, each of said thrust brackets being aligned horizontally with its associated thrust block, the top of said spring being normally approximately flat under normal stationary load, and there being slight clearance between each thrust bracket and its associated block under normal stationary load.

13. Vehicle spring suspension means including a vehicle frame member, two spring brackets rigid with said frame member and spaced longitudinally thereof, a leaf spring extending between said brackets, spring seats in each of said brackets respectively engaging the upper faces of the ends of said spring, said spring comprising a plurality of leaves differing in length with the longest leaf at the top, thrust brackets rigidly secured to opposite ends of one of said leaves below the top leaf, and thrust blocks fixed in said spring brackets adjacent said thrust brackets and at least partially aligned horizontally with said thrust brackets, there being slight clearance normally between said thrust brackets and said blocks when said leaf spring is flat, each of said thrust brackets lies horizontally opposite the respective ends of a safety spring leaf below said one leaf to which said brackets are secured, there being slight clearance between said brackets and the opposite ends of the associated safety spring leaf, whereby if said one leaf breaks said brackets and safety spring leaf substantially fix the fore-and-aft position of said spring relative to the vehicle.

14. Vehicle spring suspension means including a vehicle frame member, two spring brackets rigid with said frame member and spaced longitudinally thereof, a leaf spring extending between said brackets, spring seats in each of said brackets having spring engaging surfaces fixed with respect to said frame member and respectively engaging the upper faces of the ends of said spring, a thrust block carried by each of said brackets with each having only a single thrust surface, and stop means rigid with opposite ends of said spring, located between the thrust surfaces, and horizontally aligned with the blocks for engagement therewith, there being slight clearance normally between said rigid means and the thrust surfaces of said blocks when said leaf spring is flat.

References Cited in the file of this patent

UNITED STATES PATENTS

| | | |
|---|---|---|
| 1,566,026 | Leipert et al. | Dec. 15, 1925 |
| 1,586,164 | Tait | May 25, 1926 |
| 1,928,860 | Marcum | Oct. 3, 1933 |
| 2,400,199 | Harbers | May 14, 1946 |
| 2,437,158 | Heiney | Mar. 2, 1948 |
| 2,559,103 | Anderson | July 3, 1951 |

FOREIGN PATENTS

| | | |
|---|---|---|
| 14,253 | Australia | 1928 |
| 303,792 | Great Britain | Nov. 7, 1929 |
| 427,352 | Great Britain | Apr. 23, 1935 |